United States Patent [19]

Reuter et al.

[11] Patent Number: 5,728,283
[45] Date of Patent: Mar. 17, 1998

[54] ELECTROCOATING COMPOSITIONS AND A PROCESS FOR COATING ELECTRICALLY CONDUCTIVE SUBSTRATES

[75] Inventors: Hardy Reuter; Günther Ott; Walter Jouck, all of Münster, Germany

[73] Assignee: BASF Lacke + Farben, AG, Muenster-Hiltrup, Germany

[21] Appl. No.: 648,119

[22] PCT Filed: Sep. 15, 1994

[86] PCT No.: PCT/EP94/03088

§ 371 Date: Aug. 26, 1996

§ 102(e) Date: Aug. 26, 1996

[87] PCT Pub. No.: WO95/08597

PCT Pub. Date: Mar. 30, 1995

[30] Foreign Application Priority Data

Sep. 21, 1993 [DE] Germany ............... 43 32 014.7

[51] Int. Cl.$^6$ ............... C08F 2/58; C25D 13/00; C25D 11/00; C08L 63/00
[52] U.S. Cl. ............... 204/499; 204/500; 205/109; 205/317; 523/415
[58] Field of Search ............... 204/500; 205/109, 205/317, 499; 523/415

[56] References Cited

U.S. PATENT DOCUMENTS

| 4,069,210 | 1/1978 | Schimmel ............... 523/415 |
| 4,282,128 | 8/1981 | Pampouchidis et al. ............... 523/415 |

FOREIGN PATENT DOCUMENTS

| 0 207 570 | 6/1986 | European Pat. Off. . |
| 0 259 181 A2 | 9/1987 | European Pat. Off. . |
| 0 398 757 A2 | 5/1990 | European Pat. Off. . |
| 0 442 533 A1 | 2/1991 | European Pat. Off. . |
| 2 379 587 | 9/1978 | France . |

*Primary Examiner*—Kathryn L. Gorgos
*Assistant Examiner*—Edna Wong

[57] ABSTRACT

The invention relates to aqueous eletrocoating [sic] compositions containing cathodically depositable synthetic resins, which electrocoating compositions are characterized in that they contain polymer microparticles which have a particle size of 0.01 to 10 μm and are preparable by reacting (a) a polyisocyanate or a mixture of polyisocyanates with (b) an organic compound containing not only at least one ethylenically unsaturated double bond but also at least one active hydrogen atom per molecule or a mixture of such organic compounds and (c) an organic compound containing not only at least one active hydrogen atom but also at least one tertiary amino group and/or at least one ketimine group and/or at least one aldimine group per molecule or a mixture of such organic compounds and, if desired, (d) an organic compound other than (b) and (c) containing at least one active hydrogen atom per molecule or a mixture of such organic compounds.

The reaction product thus obtained is dispersed in water and subjected to free radical polymerization, with at least 5 percent of the tertiary and/or primary amino groups present in the reaction product being neutralized with a Brönsted acid before, during or after dispersion.

8 Claims, No Drawings

ELECTROCOATING COMPOSITIONS AND A PROCESS FOR COATING ELECTRICALLY CONDUCTIVE SUBSTRATES

This is a national stage application of PCT/ED94/03088 filed Sep. 15, 1994.

BACKGROUND OF THE INVENTION

The invention relates to aqueous electrocoating compositions containing cathodically depositable synthetic resins and to a process for coating electrically conductive substrates, in which (1) the electrically conductive substrate is dipped into an aqueous electrocoating composition,
(2) the substrate is connected as the cathode,
(3) direct current is used to deposit a film on the substrate,
(4) the coated substrate is removed from the electrocoating composition and
(5) the deposited coating film is baked.

Cathodically depositable electrocoating compositions containing synthetic resins and the cathodic electrocoating process described above in which the cathodically depositable electrocoating compositions containing synthetic resins are used have been known for a long time and are used for the automatic coating of mass articles, in particular for the automatic coating of vehicle bodies, in particular automotive bodies, to a large extent (see, for example, Glasurit Handbuch Lacke und Farben (Glasurit Handbook of Coatings and Paints), Curt R. Vincentz Verlag, Hanover, 1984, pages 374–384 and pages 457–462, and DE-A-3,518,732, DE-A-3,518,770, EP-A-40,090, EP-A-12,463, EP-A-259,181, EP-A-433,783 and EP-A-262-069 ).

The coating of electrically conductive substrates by means of the cathodic electrocoating process is associated with the problem that the edges of the substrate to be coated are only coated with a coating layer of insufficient thickness. One consequence of this is that the edges of the coated substrate are more susceptible to corrosion than the surfaces of the coated substrate. In order to solve this problem, EP-A-259,181 has recommended to add to the electrocoating composition polymer microparticles having a softening point which is at least 10° C. above the bath temperature, a solubility parameter which differs from the solubility parameter of the cathodically depositable synthetic resin by not more than 1.0, a refractive index which differs from the refractive index of the cathodically depositable synthetic resin by 0.02–0.3 or a crosslinking density of 0.01–5.05 mmol/g. According to EP-A-433,783, polymer microparticles made of crosslinked urea/aldehyde, triazine/aldehyde or phenol/aldehyde resins or polymer particles made of uncrosslinked (meth)-acrylonitrile homo- or copolymers should be added to the electrocoating compositions.

In some cases, the addition of the polymer microparticles described in EP-A-259,181 and EP-A-433,783 to electrocoating compositions leads to an improvement in edge covering. However, despite the improved edge covering, the anticorrosive effect of the electrocoat films deposited on the edge is insufficient. Moreover, the addition of the polymer microparticles described in EP-A-259,181 and EP-A-433, 783 has the disadvantage that it results in a decrease in stability of the electrocoating composition (formation of sediments in the electrocoating composition), in a deterioration of the adhesion to the substrate and/or to overcoated coating films, in a substantial deterioration of the flow behavior and in a reduction in the anticorrosive effect of the deposited electrocoat films.

DESCRIPTION OF THE PREFERRED EMBODIMENTS

The object of the present invention is to provide aqueous electrocoating compositions containing cathodidally depositable synthetic resins which produce coating films having improved properties compared with the prior art. The aqueous electrocoating compositions containing cathodically depositable synthetic resins provided by the invention should enable in particular electrically conductive substrates to be coated by means of the cathodic electrocoating process and produce coating films which provide good edge covering of the coated substrate and exhibit at least a portion of the disadvantages of the prior art described above, if at all, only to a lesser degree.

Surprisingly, this object is achieved by providing aqueous electrocoating compositions containing cathodically depositable synthetic resins, which electrocoating compositions are characterized in that they contain polymer microparticles which have a particle size of 0.01 to 10 μm and are preparable by reacting (a) a polyisocyanate or a mixture of polyisocyanates with
(b) an organic compound containing not only at least one ethylenically unsaturated double bond but also at least one active hydrogen atom per molecule or a mixture of such organic compounds and
(c) an organic compound containing not only at least one active hydrogen atom but also at least one tertiary amino group and/or at least one ketimine group and/or at least one aldimine group per molecule or a mixture of such organic compounds and, if desired,
(d) an organic compound other than (b) and (c) containing at least one active hydrogen atom per molecule or a mixture of such organic compounds in such a mass ratio that 3 to 80 percent of the NCO groups of component (a) are reacted with component (b), 3 to 80 percent of the NCO groups of component (a) are reacted with component (c) and 0 to 94 percent of the NCO groups of component (a) are reacted with component (d) and the reaction product thus obtained is dispersed in water and subjected to free radical polymerization, with at least 5 percent of the tertiary and/or primary amino groups present in the reaction product being neutralized with a Brönsted acid before, during or after dispersion.

Basically, the cathodically depositable synthetic resins present in the electrocoating compositions according to the invention can be any aqueous cathodically depositable synthetic resin suitable for aqueous electrocoating compositions. Preferably, the electrocoating compositions according to the invention contain cationic, amine-modified epoxy resins as the cathodically depositable synthetic resins. Synthetic resins of this type are known and described, for example, in DE-A-3,518,770, DE-A-3,518,732, EP-B-102, 501, DE-A-2,701,002, U.S. Pat. No. 4,104,147, EP-A-4,090, EP-A-12,463, U.S. Pat. No. 4,031,050, U.S. Pat. No. 3,922, 253, U.S. Pat. No. 4,101,486, U.S. Pat. No. 4,038,232 and U.S. Pat. No. 4,017,438. These patent documents also describe in detail the preparation of cationic, amine-modified epoxy resins.

Cationic, amine-modified epoxy resins are understood to mean cationic reaction products of (α) modified or unmodified polyepoxides with
(β) amines.

These cationic, amine-modified epoxy resins can be prepared by reacting components (α) and (β), followed, if necessary, by protonation. However, it is also possible to react an unmodified polyepoxide with an amine and to carry out further modifications on the amine-modified epoxy resin thus obtained.

Polyepoxides are understood to mean compounds containing two or more epoxy groups in the molecule.

Particularly preferred (α) components are compounds preparable by reacting (i) a diepoxy compound or a mixture of diepoxy compounds having an epoxy equivalent weight below 2000 with (ii) a compound reacting under the given reaction conditions monofunctionally towards epoxy groups and containing a phenol or thiol group, or a mixture of such compounds, components (i) and (ii) being used in a molar ratio of 10:1 to 1:1, preferably 4:1 to 1:5:1, and the reaction of component (i) with component (ii) being carried out at 100 to 190° C., if desired in the presence of a catalyst (see DE-A-3,518, 770).

Further particularly preferred (α) components are compounds preparable by a polyaddition reaction of a diepoxy compound and/or a mixture of diepoxy compounds, if desired together with at least one monoepoxy compound, which is carried out at 100 to 195° C. in the optional presence of a catalyst and is initiated by an initiator reacting monofunctionally and carrying either an alcoholic OH group, a phenolic OH group or an SH group to give an epoxy resin in which diepoxy compound and initiator are incorporated in a molar ratio of greater than 2:1 to 10:1 (see DE-A-3,518,732).

Polyepoxides which can be used for preparing the particularly preferred (α) component and can also be used themselves as (α) components are polyglycidyl ethers of polyphenols prepared from polyphenols and epihalohydrins. Examples of polyphenols which can be used very particularly preferably are bisphenol A and bisphenol F. Furthermore, 4,4'-dihydroxybenzophenone, 1,1-bis(4-hydroxyphenyl)ethane, 1,1-bis(4-hydroxyphenyl)isobutane, 2,2-bis(4-hydroxy-tert.-butylphenyl)-propane, bis(2-hydroxynaphthyl)methane, 1,5-dihydroxy-naphthalene and phenolic novolak resins are also suitable.

Further suitable polyepoxides are polyglycidyl ethers of polyhydric alcohols, such as, for example, ethylene glycol, diethylene glycol, triethylene glycol, 1,2-propylene glycol, 1,4-propylene glycol, 1,5-pentanediol, 1,2,6-hexanetriol, glycerol and 2,2-bis(4-hydroxycyclohexyl)propane. Polyglycidyl esters of polycarboxylic acids, such as, for example, oxalic acid, succinic acid, glutaric acid, terephthalic acid, 2,6-napthalenedicarboxylic acid and dimerized linoleic acid, can also be used. Typical examples are glycidyl adipate and glycidyl phthalate.

Hydantoin epoxides, epoxidized polybutadiene and polyepoxy compounds obtained by epoxidization of an olefinically unsaturated aliphatic compound are also suitable.

Modified polyepoxides are understood to mean polyepoxides in which at least a portion of the reactive groups have been reacted with a modifying compound.

Examples of modifying compounds include:

carboxyl-containing compounds, such as saturated or unsaturated monocarboxylic acids (for example benzoic acid, linseed oil fatty acid, 2-ethyl-hexanoic acid, Versatic acid), aliphatic, cycloaliphatic and/or aromatic dicarboxylic acids of various chain lengths (for example adipic acid, sebacic acid, isophthalic acid or dimeric fatty acids), hydroxyalkylcarboxylic acids (for example lactic acid, dimethylolpropionic acid) and carboxyl-containing polyesters or amino-containing compounds, such as diethylamine or ethylhexylamine or diamines having secondary amino groups, for example N,N'-dialkylalkyl-enediamines, such as dimethylethylenediamine, N,N'-dialkylpolyoxyalkyleneamines, such as N,N'-dimethylpolyoxypropylenediamine, cyanoalkylated alkylenediamines, such as bis(N,N'-cyanoethyl)-ethylenediamine, cyanoalkylated polyoxyalkyleneamines, such as bis(N,N'-cyanoethyl)-polyoxypropylenediamine, polyaminoamides, such as, for example, Versamides, in particular amino-terminated reaction products obtained from diamines (for example hexamethylenediamine), polycarboxylic acids, in particular dimeric fatty acids and monocarboxylic acids, in particular fatty acids or the reaction product of one mole of diaminohexane with two moles of monoglycidyl ether, or monoglycidyl ester, specifically glycidyl esters of α-branched fatty acids, such as of Versatic acid, or hydroxyl-containing compounds, such as neopentylglycol, bisethoxylated neopentylglycol, neopentylglycol hydroxypivalate, dimethyl-hydantoin-N,N'-diethanol, 1,6-hexanediol, 2,5-hexanediol, 1,4-bis (hydroxymethyl)cyclohexane, 1,1-isopropylidenebis (p-phenoxy)-2-propanol, tri-methylolpropane, pentaerythritol or amino alcohols, such as triethanolamine, methyldi-ethanolamine or hydroxyl-containing alkyl-ketimines, such as ketimine of methyl isobutyl ketone with aminomethyl-1,3-propanediol or ketimine of cyclohexanone with tris(hydroxy-methyl) aminomethane as well as polyglycol ethers, polyester polyols, polyether polyols, poly-caprolactone polyols, polycaprolactam polyols of various functionalities and molecular weights or saturated or unsaturated fatty acid methyl esters which are transesterified with hydroxyl groups of the epoxy resins in the presence of sodium methoxide.

The compounds used as component (β) can be primary and/or secondary amines.

The amine should preferably be a water-soluble compound. Examples of such amines are mono- and dialkylamines, such as methylamine, ethylamine, propylamine, butylamine, dimethylamine, diethylamine, dipropylamine, methylbutylamine and the like. Alkanolamines, such as, for example, methylethanolamine, diethanolamine and the like are also suitable. Also suitable are dialkylaminoalkyl-amines, such as, for example, dimethylaminoethylamine, diethylaminopropylamine, dimethylaminopropylamine and the like. Ketimine-containing amines, such as, for example, the methyl isobutyl diketimine of diethylene-triamine, can also be used. In most cases, low molecular weight amines are used, but it is also possible to use higher molecular weight monoamines.

The amines can additionally also contain other groups, as long as they do not interfere in the reaction of the amine with the epoxy group and do not lead to gelling of the reaction mixture either.

Preferably, secondary amines are used as the (β) component.

The charges necessary for water-dilutability and electrodeposition can be generated by protonation with water-soluble acids (for example boric acid, formic acid, lactic acid, preferably acetic acid). Another way of introducing cationic groups is the reaction of epoxy groups of component (α) with amine salts.

The cathodically depositable synthetic resins present in the electrocoating compositions according to the invention are usually either self-crosslinking and/or are combined with a crosslinking agent or a mixture of crosslinking agents.

Self-crosslinkable synthetic resins are obtainable by introducing into the synthetic resin molecules reactive groups which react with one another under baking conditions. For example, blocked isocyanate groups can be introduced into hydroxyl-and/or amino-containing synthetic resins, which isocyanate groups become unblocked under baking conditions and react with the hydroxyl or amino groups to give crosslinked coating films. Self-crosslinkable synthetic resins can be obtained, for example, by reacting a hydroxyl- and/or amino-containing synthetic resin with a partially blocked polyisocyanate containing on statistical average one free NCO group per molecule.

Basically, the electrocoating compositions according to the invention can contain any crosslinking agents suitable for electrocoating compositions, such as, for example, phenolic resins, polyfunctional Mannich bases, melamine resins, benzoguanamine resins, blocked polyisocyanates and compounds containing activated ester groups. The electrocoating compositions according to the invention preferably contain blocked polyisocyanates as crosslinking agents. The use of blocked polyisocyanates in electrocoating compositions containing cathodically depositable synthetic resins has been known for a long time and is described in detail, inter alia, also in the patent documents cited above. Suitable blocked polyisocyanates can be prepared, for example, by reacting component (a) described below with component (d) described below to give a product free of NCO groups.

It is essential to the invention that the electrocoating compositions according to the invention contain polymer microparticles which are preparable by reacting (a) a polyisocyanate or a mixture of polyisocyanates with (b) an organic compound containing not only at least one ethylenically unsaturated double bond but also at least one active hydrogen atom per molecule or a mixture of such organic compounds and (c) an organic compound containing not only at least one active hydrogen atom but also at least one tertiary amino group and/or at least one ketimine group and/or at least one aldimine group per molecule or a mixture of such organic compounds and, if desired, (d) an organic compound other than (b) and (c) containing at least one active hydrogen atom per molecule or a mixture of such organic compounds in such a mass ratio that 3 to 80, preferably 5 to 40, percent of the NCO groups of component (a) are reacted with component (b), 3 to 80, preferably 3 to 15, percent of the NCO groups of component (a) are reacted with component (c) and 0 to 94, preferably 45 to 92, percent of the NCO groups of component (a) are reacted with component (d) and the reaction product thus obtained is dispersed in water and subjected to free radical polymerization, with at least 5 percent, preferably at least 10 percent, of the tertiary and/or primary amino groups present in the reaction product being neutralized with a Brönsted acid before, during or after dispersion.

The reaction of components (a), (b), (c) and, if used, (d) can either be carried out in undiluted form or in organic solvents, such as, for example, hydrocarbons, such as toluene or xylene, ketones, such as methyl ethyl ketone or methyl isobutyl ketone, or ethers, such as dioxane and ethylene glycol dibutyl ether. The reaction is preferably carried out in organic solvents. The reaction temperature is usually 30 to 150, preferably 40 to 100, ° C. The reaction can also be catalyzed. Examples of suitable catalysts include organic tin compounds, such as dibutyltin dilaurate and dibutyltin oxide. The reaction is preferably carried out in the presence of a polymerization inhibitor, such as, for example, di-tert.-butylcresol, pentaerythrityl-tetrakis[3-(3,5-di-tert.-butyl-4-hydroxyphenyl)-propionate] (Irganox 1010 from Ciba Geigy) or p-benzoquinone.

The mass ratio in which the components (a), (b), (c) and, if used, (d) are to be reacted with one another to ensure that 3 to 80, preferably 5 to 40, percent of the NCO groups of component (a) are reacted with component (b), 3 to 80, preferably 3 to 15, percent of the NCO groups of component (a) are reacted with component (c) and 0 to 94, preferably 45 to 92, percent of the NCO groups of component (a) are reacted with component (d) can be easily selected by one skilled in the art using stoichiometric calculations. In some cases, it may be advantageous to react components (a), (b), (c) and, if used, (d) stepwise.

After components (a), (b), (c) and, if used, (d) have been reacted the reaction product obtained is dispersed in water and then subjected to free radical polymerization. In order to obtain a stable aqueous dispersion, a sufficient amount of a Brönsted acid or of a mixture of Brönsted acids is added to the reaction product before or during or after dispersion to neutralize at least 5 percent, preferably at least 10 percent, of the tertiary and/or primary amino groups present in the reaction product with a Brönsted acid. The primary amino groups are formed by hydrolysis of the ketimine and/or aldimine groups. Examples of Brönsted acids which can be used are acetic acid, lactic acid, oxalic acid, tartaric acid or mixtures of these Brönsted acids.

In general, the reaction product contains 0.1 to 2.3, preferably 0.2 to 0.8, mmol/g (relative to solids) of cationic groups in the form of protonated tertiary and/or primary amino groups.

The free radical polymerization of the reaction product is effected by adding a polymerization initiator forming free radicals or a mixture of polymerization initiators forming free radicals. Polymerization initiators forming free radicals are compounds which, after input of energy, for example by irradiation, or input of thermal energy (i.e. by heating), decompose to give free radicals and initiate the polymerization of the ethylenically unsaturated double bonds introduced into the reaction product via component (b). Furthermore, redox systems can be used. The time at which the polymerization initiator forming free radicals or the mixture of polymerization initiators forming free radicals is added to the reaction product must be selected in such a manner that the free radical polymerization of the reaction product does not take place until dispersion of the reaction product in water is complete. The compounds which are used as polymerization initiators forming free radicals are preferably those polymerization initiators forming free radicals which decompose to give free radicals upon input of thermal energy. Particularly preferably, the polymerization initiators forming free radicals which are used are those forming free radicals at temperatures from 50° C. onwards.

Examples of polymerization initiators forming free radicals which can be used are azo compounds, such as, for example, azobisisobutyronitrile, azobisiso-valeronitrile, peroxy compounds, such as, for example, dilauroyl peroxide, diacetyl peroxydicarbonate, tert-butyl peroxydiethylacetate and dibenzoyl peroxide, and redox systems, such as, for example, hydrogen peroxide or potassium peroxydisulfate in combination with iron(II) sulfate and sodium sulfite.

The component (a) used can be basically any organic compound which on statistical average contains at least 1.1 NCO groups per molecule or a mixture of such organic compounds. The component (a) used is preferably a polyisocyanate which on statistical average contains 1.1 to 3.0 NCO groups per molecule or a mixture of such polyisocyanates. The component (a) used can be aliphatic, cycloaliphatic or aromatic polyisocyanates, adducts containing cyanurate and/or biuret groups and prepared from these polyisocyanates, and prepolymers containing NCO groups and prepared from these polyisocyanates and hydroxyl- and/or amino-containing lower- or higher-molecular-weight compounds (for example trimethylolpropane, polyester polyols and polyether polyols). Examples of useful polyisocyanates include: 2,4- and 2,6-tolylene diisocyanate, isophorone diisocyanate, hexamethylene diisocyanate, 4,4'- and 2,4'-diisocyanatodiphenylmethane. Polyisocyanates containing carbodiimide and/or uretonimine groups can also be used as component (a).

The component (b) used can be basically any organic compound which contains not only at least one ethylenically unsaturated double bond but also at least active hydrogen atom per molecule or a mixture of such organic compounds. Active hydrogen atoms are understood to mean hydrogen atoms which are reactive with NCO groups. The component (b) used can be for example an organic compound which contains not only an ethylenically unsaturated double bond but also a hydroxyl, amino or mercapto group per molecule.

The component (b) used is preferably a derivative of acrylic acid or methacrylic acid containing a hydroxyl or mercapto group, preferably a hydroxyl group, or a mixture of such derivatives of acrylic acid or methacrylic acid. Examples of useful acrylic or methacrylic acid derivatives include: 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 4-hydroxybutyl acrylate, 4-hydroxybutyl methacrylate and ethoxylated or propoxylated derivatives thereof containing 1–50, preferably 1–8, particularly preferably 1–3, alkylene oxide units. The component (b) used is very particularly preferably a hydroxyalkyl ester of acrylic acid or methacrylic acid or a mixture of hydroxyalkyl esters of acrylic acid or methacrylic acid. The hydroxyalkyl esters usually contain 1 to 6, preferably 2 to 4, carbon atoms in the alcohol radical. Examples of very particularly preferably used hydroxyalkyl esters include: 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 4-hydroxybutyl acrylate and 4-hydroxybutyl methacrylate.

The component (c) used can be basically any organic compound which contains not only at least one active hydrogen atom but also at least one tertiary amino group and/or at least one ketimine and/or at least one aldimine group per molecule or a mixture of such organic compounds. Active hydrogen atoms are understood to mean hydrogen atoms which are reactive with NCO groups. The ketimine- or aldimine-containing compounds are obtainable by reacting compounds which contain not only a hydrogen atom which is active with respect to NCO groups but also at least one primary amino group in the molecule with a ketone, such as, for example, acetone, methyl ethyl ketone or methyl isobutyl ketone or an aldehyde, preferably in an organic solvent, such as, for example, xylene, toluene or n-hexane. The reaction is usually carried out at elevated temperatures with removal of the water of reaction by azeotropic distillation.

The component (c) used can be, for example, an organic compound which contains not only a hydroxyl, amino or mercapto group but also at least one tertiary amino group and/or at least one ketimine group and/or at least one aldimine group per molecule. Of these, compounds which contain not only a hydroxyl, a primary amino or a secondary amino group but also a tertiary amino group or a ketimine group per molecule are preferred. Examples of such compounds include: N,N-dimethylethanolamine, N,N-diethylethanolamine, N,N-butylethylpropanolamine, N,N-dimethylaminoethylamine, N,N-diethylaminoethylamine, N,N-dimethylaminopropyl-amine, N,N-diethylaminopropylamine, N,N-dimethylamino-ethyl mercaptan, N,N-diethylaminoethyl mercaptan and reaction products of acetone, methyl ethyl ketone, methyl isobutyl ketone, dihydroisophorone or isophorone with β-aminoethanol, β-aminomercaptan [sic], 2,2'-aminoethoxyethanol, N-aminoethylpiperazine, diethylenetriamine, dipropylenetriamine and dibutylenetriamine.

The compounds used as component (c) are particularly preferably those of the general formula A-R$^3$-X (I) where A is a group of the general formula R$^1$R$^2$N— or R$^1$R$^2$C=N—, R$^3$ is an alkylene radical having 1 to 20, preferably 2 to 6, particularly preferably 2 to 4, carbon atoms or is a group of the general formula -R$^4$—O—R$^5$- and X is a hydroxyl group, a primary amino group or a group of the general formula —NH—R$^6$ where R$^1$ and R$^2$ can be identical or different and are each a hydrocarbon radical having 1 to 20, preferably 1 to 6, and particularly preferably are each an alkyl radical having 1 to 6, preferably 1 to 4, carbon atoms, R$^4$ and R$^5$ can be identical or different and are each an alkylene radical having 1 to 12, preferably 1 to 6, particularly preferably 1 to 4, carbon atoms and R$^6$ is a hydrocarbon radical having 1 to 20, preferably 1 to 6, particularly preferably an alkyl radical having 1 to 6, preferably 1 to 4, carbon atoms or is a group of the general formula -R$^3$-A where A and R$^3$ are as defined above. Examples of compounds of the general formula (I) include: N,N-dimethylethanolamine, N,N-diethylethanol-amine, N,N-dimethylpropanolamine, N,N-diethylpropanol-amine, N,N-butylethylpropanolamine, N,N-dimethylamino-ethylamine, N,N-dimethylaminopropylamine, N,N-diethyl-aminoethylamine, N,N-diethylaminopropylamine and reaction products of acetone, methyl ethyl ketone, methyl isobutyl ketone, dihydroisophorone or isophorone with β-aminoethanol, 2,2'-aminoethoxyethanol, N-aminoethylpiperazine, diethylenetriamine and dipropylenetriamine.

The component (d) used can be basically any organic compound other than (b) and (c) which contains at least one active hydrogen atom per molecule or a mixture of such organic compounds. Preferably, well-known blocking agents for polyisocyanates as used as component (d). Examples include: aliphatic monoethers of alkanediols, such as ethyl-, propyl- and butylglycol; aliphatic monoalcohols having 1 to 4 carbon atoms in the molecule, such as methanol, ethanol, propanol and butanol; cycloaliphatic monoalcohols, such as cyclohexanol; aromatic alkyl alcohols, such as phenylcarbinol; phenol compounds, such as phenol itself and substituted phenols, such as cresol, nitrophenol, chlorophenol and ethylphenol; amines, such as di-n-butylamine, di-sec.-butylamine, dicyclohexylamine, piperidine, 2-methylpiperidine and 2,6-dimethylpiperidine; oximes, such as acetone oxime, butanone oxime, diethyl ketoxime, methyl ethyl ketoxime, methyl isobutyl ketoxime, diisopropyl ketoxime, cyclohexanone oxime, 2-methylcyclohexanone oxime, 2,6-dimethylcyclohexanone oxime, acetophenone oxime; lactams, such as ε-caprolactam and acidic CH compounds, such as dialkyl malonates, alkyl acetoacetates, acetylacetone; heterocyclic compounds, such as furfuryl alcohol and the like. The component (d) used can also be polyols, preferably aliphatic polyols, containing 2 to 20, preferably 2 to 10, carbon atoms and 2 to 5, preferably 2 to 3, hydroxyl groups per molecule, such as, for example, ethylene glycol, propanediol, butanediol, hexanediol, glycerol and trimethylolpropane. Furthermore, the component (d) used can be hydroxyl-containing polyethylene oxides, polypropylene oxides, polytetramethylene oxides and copolymers thereof.

The aqueous electrocoating compositions according to the invention can also contain, apart from the components described above, other customary coating components, such as, for example, organic solvents, pigments, fillers, wetting agents, anticrater additives and the like.

The solids content of the electrocoating compositions according to the invention is in general 5 to 40, preferably 10 to 40, particularly preferably 20 to 40, percent by weight.

The non-volatile content of the electrocoating compositions according to the invention consists of 35 to 70, preferably 35 to 65, % by weight of a cathodically depositable synthetic resin or a mixture of cathodically depositable synthetic resins, of 0 to 45, preferably 10 to 35, % by weight of a crosslinking agent other than the polymer microparticles used according to the invention or a mixture of crosslinking agents other than the polymer microparticles used according to the invention, of 5 to 45, preferably 10 to 20, % by weight of the polymer microparticles used according to the invention and of 5 to 35, preferably 15 to 35, % by weight of pigments and/or fillers.

The electrocoating compositions according to the invention are used for coating electrically conductive substrates, in which case (1) the electrically conductive substrate is dipped into an aqueous electrocoating composition, (2) the substrate is connected as the cathode, (3) direct current is used to deposit a film on the substrate, (4) the coated substrate is removed from the electrocoating composition and (5) the deposited coating film is baked.

The process described above is known and has been widely used for a number of years (see also the patent documents cited above). The voltage applied can vary over a wide range and can be, for example, between 2 and 1000 V. However, typically the voltages used are between 50 and 500 V. The current density is usually between about 10 and 100 A/m². Over the course of deposition, the current density tends to drop. As soon as the coating film has been deposited on the substrate, the coated substrate is removed from the electrocoating composition and rinsed off. The deposited coating film is then baked. The baking temperatures are usually 130 to 200° C., preferably 150 to 180° C., and the baking time is in general between 10 and 60 minutes, preferably between 15 and 30 minutes.

Using the process described above, it is in principle possible to coat any electrically conductive substrate. Examples of electrically conductive substrates include substrates made of metal, such as steel, aluminum, copper and the like.

The invention is described in more detail in the examples below. All parts and percentages are by weight unless expressly stated otherwise.

1. Preparation of crosslinking agents 1.1 Crosslinking agent I

A reactor equipped with stirrer, reflux condenser, internal thermometer and inert gas feed line is charged with 1046 g of isomers and oligomers of higher functionality based on 4,4'-diisocyanato-diphenylmethane having an NCO equivalent weight of 135 (Lupranat® M2OS, BASF; NCO functionality about 2.7; 2,2'- and 2,4'-diisocyanatodiphenylmethane content below 5%) under a nitrogen atmosphere. 2 g of dibutyltin dilaurate are added, and 963 g of butyldiglycol are added at such a rate that the product temperature remains below 60° C. It may be necessary to carry out cooling. After addition is complete, the temperature is maintained at 60° C. for another 60 minutes, and determination of the NCO equivalent weight gives 1120 (relative to solid components). After incipient dissolution in 774 g of methyl isobutyl ketone and addition of 3 g of dibutyltin dilaurate, 87 g of a trimethylolpropane melt are added at such a rate that the product temperature does not exceed 100° C. After addition is complete, the mixture is allowed to afterreact for another 60 minutes. A subsequent check shows that no more NCO groups can be detected. The mixture is cooled to 65° C. and simultaneously diluted with 96 g of sec-butanol and 30 g of methyl isobutyl ketone. The solids content is 70.1% (1 h at 130° C.).

1.2 Crosslinking agent II

In a reactor such as described in the example above, 1464 g of trimerized hexamethylene diisocyanate having an NCO equivalent weight of 191 ("Basonat® PLR 8638", BASF) and 510 g of methyl isobutyl ketone are heated to 50° C. with stirring under a nitrogen atmosphere. 936 g of di-n-butylamine are then added dropwise over a period of 4 hours. During this addition, the temperature is maintained below 55° C. by cooling. The solution of the crosslinking agent is then cooled and diluted with 90 g of n-butanol. A subsequent check shows that no more NCO groups can be detected. The solids content is 79.8% (measured 1 h at 130° C.).

2. Preparation of an aqueous dispersion containing a cathodically depositable synthetic resin and mixture of crosslinking agents In a reactor, 1228 parts of epoxy resin based on bisphenol A and having an epoxy equivalent weight (EEW) of 188 are heated together with 279 parts of bisphenol A, 268 parts of dodecylphenol and 89 parts of xylene to 105° C. under a nitrogen atmosphere. Traces of water are removed in vacuo by azeotropic reflux distillation over a period of 20 minutes using a water separator. The mixture is then heated to 130° C., and 5 parts of N,N-dimethylbenzylamine are added. The reaction batch is maintained at this temperature until the EEW has reached a value of 870. 39 parts of butylglycol, 204 parts of sec-butanol and—after cooling below 115° C.—139 parts of diethanolamine are then added, and the mixture is further cooled to 90° C. One hour after addition of the amine, 192 parts of Plastilit 3060 (propylene glycol compound, BASF) are added, and the resulting mixture is diluted with 144 parts of sec-butanol and 55 parts of propylene glycol phenyl ether and simultaneously rapidly cooled to 65° C. 39 parts of N,N-dimethylaminopropylamine are then added, the temperature is maintained for half an hour, and the mixture is then heated to 90° C. This temperature is maintained for 1.5 hours. The mixture is then cooled to 70° C. 743 parts of crosslinking agent I (item 1.1) and 650 parts of crosslinking agent II (item 1.2) are added to the reaction mixture, which is homogenized for 10 minutes and transferred to a dispersing vessel. There 107 parts of lactic acid (88% in water) in 2203 parts of deionized water are added in portions with stirring. The mixture is then homogenized for 20 minutes before being further diluted with another 3593 parts of deionized water in small portions.

The volatile solvents are removed by distillation in vacuo and then replaced by the same amount of deionized water. The dispersion has the following characteristic data:

Solids content: 32% (1 hour at 130° C.)
Base content: 0.66 milliequivalents/g of solids
Acid content: 0.25 milliequivalents/g of solids
pH: 6.1

3. Preparation of a gray pigment paste 2781 parts of bisphenol A diglycidyl ether, 144 parts of xylene and 581 parts of bisphenol A are reacted in the presence of 0.2 part of triphenylphosphine at 150°–160° C. until an EEW of 345 is reached. The batch is then diluted with 2161 parts of butylglycol and cooled to 49° C. A mixture of 777 parts of 9-amino-3,6-dioxanonan-1-1 and 407 parts of N,N-dimethylaminopropylamine is then added over a period of 6 minutes, whereupon the temperature rises to 110° C. The mixture is maintained between 110° and 115° C. for one hour before adding 645 parts of butylglycol and cooling the batch to 77° C. 149 parts of nonylphenol glycidyl ether are then added. This causes the temperature to rise to 90° C. and the mixture is maintained at this temperature for one hour before being diluted with 1003 parts of butylglycol and cooled. The solids content of the thin resin solution is 60%.

To prepare the pigment paste, first 280 parts of water and 250 parts of the resin solution described above are premixed. 5 parts of carbon black, 35 parts of basic lead pigment, 90 parts of the extender HEWP[1]), 315 parts of titanium dioxide (R 900), 5 parts of Bentone EW[2]) and 20 parts of dibutyltin oxide are then added. The mixture is predispersed for 30 minutes using a high-speed stirrer of the dissolver type. The mixture is then dispersed in a laboratory mini mill (Motor Mini Mill, Eiger Engineering Ltd., Great Britain) for 1 to 1.5 hours until a Hegmann fineness of smaller than/equal to 12 is reached, and the resulting dispersion is adjusted to a processing viscosity using further amounts of water. This gives a pigment paste which is stable to demixing.

[1]) English China Clay Int., Great Britain
[2]) Rheox, Germany

4. Preparation of aqueous dispersions containing the polymer microparticles used according to the invention 4.1 Preparation of dispersion I A reactor equipped with stirrer, reflux condenser, internal thermometer and inert gas line is charged with 1021 g of tolylene diisocyanate (mixture of about 80% by weight of the 2,4 isomer and 20% by weight of the 2,6 isomer) and 180 g of methyl isobutyl ketone under a nitrogen atmosphere. 0.4 g of dibutyltin dilaurate is added, and a solution of 254 g of trimethylolpropane in 254 g of methyl isobutyl ketone temperature-controlled at 70° C. is introduced over a period of one hour. The cooling is regulated in such a manner that the temperature does not exceed 60° C. 30 minutes after addition is complete, an NCO equivalent weight of 217, relative to solids, is measured. While cooling is continued, 102 g of n-propylglycol are added dropwise over a period of 20 minutes, during which the temperature is not allowed to rise above 55° C. The reaction mixture is then cooled to 40° C. 564 g of hydroxypropyl methacrylate in which 0.4 g of di-tert-butyl-p-cresol was previously dissolved are added dropwise to the reactor contents. The rate of addition is controlled in such a manner that the temperature of the reaction mixture does not exceed 50° C. After the addition is complete (after about one hour), the batch is maintained at 50° C., and determination of the NCO equivalent weight gives 1670, relative to the solids content. After simultaneous addition of 433 g of methyl isobutyl ketone and cooling to 35° C., 115 g of N,N-diethylethanolamine are added to the reaction mixture in one portion. After 30 minutes, another 0.6 g of di-tert-butyl-p-cresol in 20 g of sec-butanol is added. As soon as no more NCO groups can be detected, 16 g of azobisisovaleronitrile which was previously dissolved in 39 g of methyl isobutyl ketone are added to the reaction mixture. In a dispersing vessel, 492 parts of deionized water containing 35 parts of lactic acid (88% in water) are added to 1309 parts of the organic solution thus obtained. The mixture is then homogenized for 20 minutes, diluted with another 995 parts of deionized water with stirring, the resulting mixture is heated to 70° C. and stirred at this temperature for 10 hours. The dispersion thus obtained has a solids content of 32.2% (1 h, 130° C.).

4.2 Dispersion II 4.2.1. Preparation of an organic compound containing not only an active hydrogen atom but also a ketimine group per molecule A reactor equipped with stirrer, inert gas line, water separator and reflux condenser is charged with 1100 g of 2,2'-aminoethoxyethanol ($H_2N$—$CH_2CH_2$—O—$CH_2CH_2$—OH) and 1886 g of methyl isobutyl ketone, and the mixture is slowly heated in a nitrogen atmosphere with stirring. The water of condensation starts to separate at 109° C. The temperature is raised in small increments to 142° C. over a period of 3 hours, and the mixture is maintained at this temperature until 189 g of water have been removed. It is then cooled to 40° C. and discharged under nitrogen.

The cooled solution has an amine equivalent weight of 265.

4.2.2 Preparation of dispersion II

A reactor equipped with stirrer, reflux condenser, internal thermometer and inert gas line is charged with 992 g of tolylene diisocyanate (mixture of about 80% by weight of the 2,4 isomer and 20% by weight of the 2,6 isomer) and 175 g of methyl isobutyl ketone under a nitrogen atmosphere. 0.4 g of dibutyltin dilaurate is added, and a solution of 247 g of trimethylolpropane in 247 g of methyl isobutyl ketone temperature-controlled at 70° C. is introduced over a period of one hour. The cooling is regulated in such a manner that the temperature does not exceed 60° C. 30 minutes after addition is complete, an NCO equivalent weight of 208 (relative to solids) is measured. While cooling is continued, 119 g of n-propylglycol are added dropwise over a period of 20 minutes, during which the temperature is not allowed to rise above 55° C. The reaction mixture is then cooled to 40° C. 548 g of hydoxypropyl methacrylate [sic] in which 0.4 g of di-tert-butyl-p-cresol was previously dissolved are added dropwise to the reactor contents. The rate of addition is controlled in such a manner that the temperature of the reaction mixture does not exceed 50°C. After the addition is complete (after about one hour), the batch continues to be maintained at 50° C., and determination of the NCO equivalent weight gives 2015, relative to the solids content. After simultaneous addition of 420 g of methyl isobutyl ketone and cooling to 35° C., 178 g of the reaction product described in item 4.2.1 obtained from 2,2'-aminoethoxyethanol and methyl isobutyl ketone are added to the reaction mixture in one portion. After 30 minutes, another 0.6 g of di-tert-butyl-p-cresol in 19 g of sec-butanol is added. As soon as no more NCO groups can be detected, 16 g of azobisisobutyronitrile which was previously dissolved in 38 g of methyl isobutyl ketone are added to the reaction mixture. In a dispersing vessel, 1718 parts of deionized water containing 57 parts of lactic acid (88% in water) are added to 2142 parts of the organic solution thus obtained. 25 parts of butylglycol are then added, and the mixture is homogenized for 20 minutes. It is further diluted with another 3488 parts of deionized water and with stirring, heated to 70° C. and stirred at this temperature for 10 hours. The dispersion thus obtained has a solids content of 20.4% (1 h, 130° C.).

5. Preparation and deposition of electrocoating compositions according to, the invention

5.1 Electrocoating composition (I)

2078 parts of the dispersion according to item 2. and 516 parts of the dispersion according to item 4.1 are mixed, and the resulting mixture is diluted with 1500 parts of deionized water and 25 parts of a 10% aqueous lactic acid solution. 646 parts of the pigment paste according to item 3. are added to the resulting mixture with stirring. The electrocoating composition thus obtained is made up to 5000 parts with deionized water. After 5 days of aging at room temperature, it is deposited on a steel test panel which is connected as the cathode. The deposition voltage is 300 V, the deposition time 2 minutes and the bath temperature is adjusted to 30° C. The deposited coating film is rinsed off with deionized water and baked at 165° C. for 20 minutes. The baked coating films thus obtained were tested. The test results can be seen in Table 1.

5.2 Electrocoating composition (II)

2078 parts of the dispersion according to item 2. and 815 parts of the dispersion according to item 4.2 are mixed, and the resulting mixture is diluted with 1300 parts of deionized water and 25 parts of a 10% aqueous lactic acid solution. 646 parts of the pigment paste according to item 3. are added to the resulting mixture with stirring. The electrocoating composition thus obtained is made up to 5000 parts with deionized water. After 5 days of aging at room temperature, it is deposited on a steel test panel which is connected as the cathode. The deposition voltage is 300 V, the deposition time 2 minutes and the bath temperature is adjusted to 30° C. The deposited coating film is rinsed off with deionized water and baked at 165° C. for 20 minutes. The baked coating films thus obtained were tested. The test results can be seen in Table 1.

6. Preparation and deposition of a prior art electrocoating composition (electrocoating composition (III); comparative example)

2598 parts of the dispersion according to item 2. are diluted with 1500 parts of deionized water and 25 parts of a 10% aqueous lactic acid solution. 646 parts of the pigment paste according to item 3. are added to the resulting mixture with stirring. The electrocoating composition thus obtained is made up to 5000 parts with deionized water. After 5 days of aging at room temperature, it is deposited on a steel test panel which is connected as the cathode. The deposition voltage is 300 V, the deposition time 2 minutes and the bath temperature is adjusted to 30° C. The deposited coating film is rinsed off with deionized water and baked at 165° C. for 20 minutes. The baked coating films thus obtained were tested. The test results can be seen in Table 1.

TABLE 1

| Electrocoating composition | (I) | (II) | (III) |
| --- | --- | --- | --- |
| 360 h of exposure to salt spray mist in accordance with ASTM B 117 | | | |
| Underfilm corrosion in mm | 0.6 | 0.7 | 0.8 |
| Surface rust[1] | 1 | 1 | 1 |
| Edge rust[1] | 1 | 1 | 5 |
| Electrical performance factor[2] in % | 95 | 100 | 4 |
| Sand abrasion[3] in accordance with Specification No. 4100 of Adam Opel AG in $\mu m^{-1}$ | 1.2 | 1.6 | 1.0 |

[1] 0 = best value; 5 = worst value

TABLE 1-continued

| Electrocoating composition | (I) | (II) | (III) |
| --- | --- | --- | --- |

[2] This factor is determined by applying a voltage of 50–1000 V to the coated edge and determining the insulating effect against electric current. The higher the electrical performance factor, the higher the insulating effect. The higher the insulating effect, the more efficient the coating of the edge with an electrocoat film.

[3] The higher the value, the higher the resistance of the coating film to sand abrasion.

We claim:

1. An aqueous electrocoating composition comprising cathodically depositable synthetic resins and an additive comprising crosslinked polymer microparticles which have a particle size of 0.01 to 10 μm wherein the crosslinked polymer microparticles are prepared by reacting (a) a polyisocyanate or a mixture of polyisocyanates with, (b) an organic compound containing at least one ethylenically unsaturated double bond and at least one active hydrogen atom per molecule of the organic compound or a mixture thereof, (c) an organic compound containing at least one active hydrogen atom and at least one group per molecule of organic compound selected from the group consisting of a tertiary amino group, a ketimine group, an aldimine group and mixtures thereof and, optionally, (d) an organic compound other than (b) and (c) containing at least one active hydrogen atom per molecule of the organic compound or a mixture thereof; in a mass ratio so that 3 to 80 percent of the isocyanate (NCO) groups of component (a) are reacted with component (b), 3 to 80 percent of the NCO groups of component (a) are reacted with component (c) and 0 to 94 percent of the NCO groups of component (a) are reacted with component (d) and a reaction product thus obtained comprising primary amino groups, tertiary amino groups or mixtures thereof is dispersed in water and subjected to free radical polymerization, wherein prior to free radical polymerization, at least 5 percent of the amino groups are neutralized with a Brönsted acid before, during or after dispersion.

2. The electrocoating composition according to claim 1, wherein component (a) is selected from the group consisting of polyisocyanates which on statistical average contain 1.1 to 3.0 NCO groups per molecule and mixtures thereof.

3. The electrocoating composition according to claim 1 wherein component (b) is a derivative of acrylic acid or methacrylic acid containing a group selected from the group consisting of hydroxyl, amino, and mercapto groups and mixtures thereof.

4. The electrocoating composition according to claim 1 wherein component (b) is selected from the group consisting of hydroxyalkyl esters of acrylic acid, hydroxy alkyl esters of methacrylic acid and mixtures thereof.

5. The electrocoating composition according to claim 1 wherein component (c) is a compound of the general formula A-$R^3$-X or a mixture thereof, where A is selected from the group consisting of $R^1R^2N$— and $R^1R^2C$=N—; $R^3$ is an alkylene radical having 1 to 20 carbon atoms or a group of the general formula -$R^4$—O—$R^5$-; and X is selected from the group consisting of a hydroxyl group, a primary amino group and a group of the general formula —NH—$R^6$ where $R^1$ and $R^2$ can be identical or different and are each a hydrocarbon radical having 1 to 20 carbon atoms, $R^4$ and $R^5$ can be identical or different and are each an alkylene radical having 1 to 12 carbon atoms and $R^6$ is a hydrocarbon radical having 1 to 20 carbon atoms or a group of the formula -R³-A where A and R³ are as defined above.

6. The electrocoating composition according to claim 1 wherein the components (a), (b), (c) and, (d) are reacted with one another in a mass ratio so that 5 to 40 percent of the NCO groups of component (a) are reacted with component (b), 3 to 15 percent of the NCO groups of component (a) are reacted with component (c) and 45 to 92 percent of the NCO groups of component (a) are reacted with component (d).

7. A process for coating electrically conductive substrates comprising the steps of
   (1) dipping the electrically conductive substrate into the aqueous electrocoating composition according to claim 1,
   (2) connecting the substrate as the cathode,
   (3) depositing a film on the substrate by means of a direct current to form a coated substrate,
   (4) removing the coated substrate from the electrocoating composition and
   (5) baking the deposited coating film.

8. A method for improving edge coverage of an electrocoated substrate comprising
   (a) forming an aqueous electrocoating composition comprising cathodically depositable synthetic resins and crosslinked polymer microparticles which have a particle size of 0.01 to 10 μm wherein the crosslinked polymer microparticles are prepared by reacting
      (i) a polyisocyanate or a mixture of polyisocyanates with,
      (ii) an organic compound containing at least one ethylenically unsaturated double bond and at least one active hydrogen atom per molecule of the organic compound or a mixture thereof,
      (iii) an organic compound containing at least one active hydrogen atom and at least one group per molecule of the organic compound selected from the group consisting of a tertiary amino group, a ketimine group, an aldimine group and mixtures thereof and, optionally,
      (iv) an organic compound other than (b) and (c) containing at least one active hydrogen atom per molecule of the organic compound or a mixture thereof; in a mass ratio so that 3 to 80 percent of the isocyanate (NCO) groups of component (a) are reacted with component (b), 3 to 80 percent of the NCO groups of component (a) are reacted with component (c) and 0 to 94 percent of the NCO groups of component (a) are reacted with component (d) and a reaction product thus obtained comprising primary or tertiary amino groups is dispersed in water and subjected to free radical polymerization, wherein prior to free radical polymerization, at least 5 percent of the amino groups are neutralized with a Brönsted acid before, during or after dispersion,
   (b) dipping an electrically conductive substrate into the aqueous electrocoating composition,
   (c) connecting the substrate as the cathode,
   (d) depositing a film on the substrate by means of a direct current to form a coated substrate,
   (e) removing the coated substrate from the electrocoating composition and
   (f) baking the deposited coating film.

* * * * *